United States Patent

[11] 3,601,340

| | | |
|---|---|---|
| [72] | Inventor | Jack H. Hilbig<br>Chula Vista, Calif. |
| [21] | Appl. No. | 828,694 |
| [22] | Filed | May 28, 1969 |
| [45] | Patented | Aug. 24, 1971 |
| [73] | Assignee | Rohr Corporation<br>Chula Vista, Calif. |

[54] METHOD AND APPARATUS FOR AUGMENTING AND REVERSING THRUST AND REDUCING NOZZLE BASE DRAG AND NOISE OF AN AIRCRAFT JET ENGINE
6 Claims, 7 Drawing Figs.

[52] U.S. Cl. ........................................... 244/53,
239/265.17, 239/265.19
[51] Int. Cl. .................................................. B64d 33/04
[50] Field of Search ........................................... 244/52, 53,
12, 23; 239/265.17, 265.19

[56] References Cited
UNITED STATES PATENTS

| | | | | |
|---|---|---|---|---|
| 2,680,948 | 6/1954 | Greene | | 239/265.17 |
| 2,871,656 | 2/1959 | Johnson | | 244/52 X |
| 3,084,507 | 4/1963 | Kleinhans et al. | | 239/265.17 |

Primary Examiner—Milton Buchler
Assistant Examiner—Steven W. Weinrieb
Attorney—George E. Pearson ABSTRACT: In a retracted position a pair of deflectors are disposed in spaced relation adjacent the periphery of the aft end of an aircraft housing, so that air flowing past the housing is deflected toward and around the exhaust gas discharged from a jet engine in the housing. A tubular ejector is movable from a position around the housing to a downstream position wherein said exhaust gas flows through the housing. When the ejector is deployed downstream the deflectors are moved to a partially deployed position wherein they intercept a larger volume of air flowing past the housing and deflect the same into the ejector. In a fully deployed position the deflectors are disposed downstream from the housing and deflect exhaust gas in the forward direction, the ejector being at this time retracted to its position around the housing.

INVENTOR.
JACK H. HILBIG

BY
Edwin D. Grant
ATTORNEY

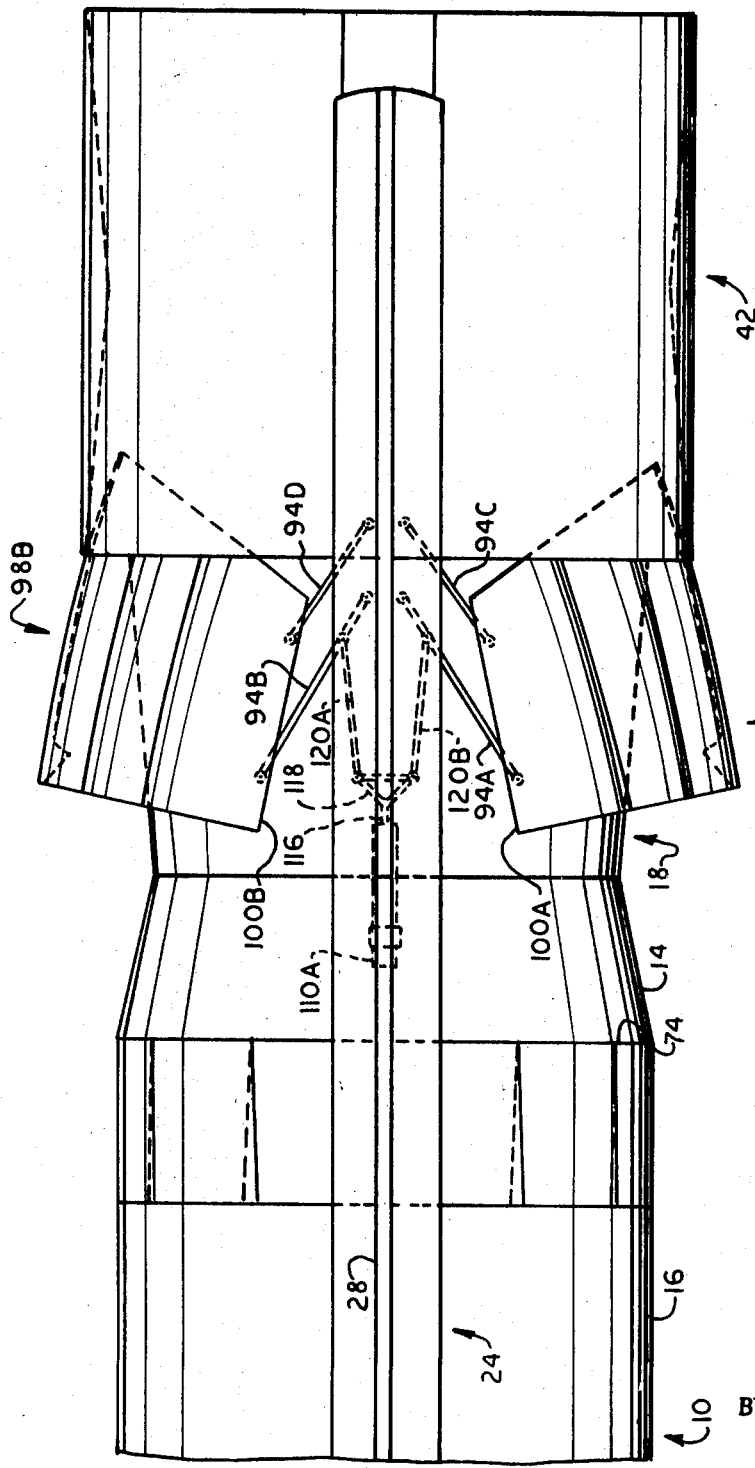

METHOD AND APPARATUS FOR AUGMENTING AND REVERSING THRUST AND REDUCING NOZZLE BASE DRAG AND NOISE OF AN AIRCRAFT JET ENGINE

SUMMARY OF THE INVENTION

This invention relates to jet-propelled aircraft and more particularly to an arrangement and operational method whereby thrust-reversing deflectors can be employed not only to reverse the thrust of a jet engine at the time an aircraft is landing but also to augment the thrust of said engine during takeoff of the aircraft by increasing the amount of airflow through an ejector, and to both augment thrust and suppress noise during cruise flight.

Jet-propelled aircraft have heretofore been provided with deflectors that are movable between a retracted position wherein the deflectors form a streamlined part of a housing enclosing a jet engine, and a deployed position where in the deflectors intercept the thrust gas discharged from said engine and change the flow direction thereof to thereby effect thrust reversal. Deflectors arranged in this manner have no utility except for thrust reversal, and are thus retracted until an aircraft provided therewith is approaching an airport to land. In contrast with such prior art deflector arrangements and method of their use, the apparatus and operational procedure disclosed herein utilize deflectors both for reversing the thrust of a jet engine during landing of an aircraft and for augmenting the thrust of said engine during all other operational conditions. Furthermore, the invention provides effective means for suppressing the noise of operation of jet aircraft.

In an exemplary embodiment of the present invention a pair of elongate supports are fixedly mounted on opposite sides of aircraft engine housing having a corrugated thrust nozzle at the aft end thereof, the supports extending rearwardly from the housing and their longitudinal axes being parallel to the longitudinal axis of the latter. A tubular ejector is movable by a suitable drive mechanism axially of the aforesaid supports and between a forward or retracted position wherein it constitutes a portion of the wall of the engine housing and a downstream or deployed position wherein its forward edge is even with the aft edge of the thrust nozzle. Pivotally connected to the supports are a multiplicity of arms which respectively support a pair of generally hemicylindrical, longitudinally corrugated deflectors. Actuators are mounted on the supports and connected to certain of the arms which support the deflectors so that the latter can be simultaneously moved to retracted, partially deployed, and fully deployed positions. During cruise flight of the aircraft equipped with the herein disclosed apparatus, the deflectors are disposed in the retracted position and their forward edges are spaced outwardly from the aft end of the engine housing, the walls of the deflectors extending into the corrugations of said nozzle so as to provide a passage between each deflector and the nozzle which conforms with the shape of the lobes of the latter. Thus air which flows past the engine housing enters the gaps between the deflectors and the nozzle and flows between the lobes of the latter, thereby eliminating the adverse pressure condition which occurs at the aft end of conventional corrugated thrust nozzle assemblies and which results in base drag. Also when the deflectors are retracted the aforedescribed airflow suppresses the noise of the jetstreams issuing from the nozzle and augments the thrust of said jetstreams. At the time the aircraft equipped with the described apparatus is taking off (or at any other time when maximum thrust is required) the ejector is deployed to its downstream position so that thrust gas discharged from the nozzle flows therethrough, and the deflectors are then moved to the partially deployed position wherein their forward edges are spaced farther from the aft end of the engine housing than they are in the retracted position of the deflectors, with the result that a larger volume of the air flowing past said housing is intercepted by said deflectors and directed into the throat of the ejector and toward the longitudinal axis thereof. Furthermore, in the partially deployed position the deflectors project outwardly from the forward edge of the ejector and hence intercept and direct into the ejector air which would not otherwise enter it. The deflectors and ejector are returned to their retracted positions during cruise flight. When the aircraft approaches an airport to land, the deflectors are moved to the fully deployed position wherein they intercept thrust gas discharged from the nozzle and change the flow direction thereof to thereby reverse the thrust of the propulsion assembly.

OBJECTS OF THE INVENTION

It is accordingly an object of this invention to provide an effective method for augmenting the thrust of a jet propulsion unit of an aircraft during takeoff and cruise flight, and for reversing the thrust of said unit at the time the aircraft must be decelerated.

Another object of the invention is to provide apparatus which in one operational mode both augments the thrust of an aircraft jet engine and suppresses the noise of said engine, and which in another operational mode reverses the thrust of said engine.

An additional object is to utilize deflectors not only to reverse the thrust of an aircraft jet engine but also to increase mass flow of air through a tubular ejector when maximum thrust is required, as well as to augment thrust of said engine under cruise flight conditions.

DESCRIPTION OF THE DRAWINGS

In the drawings:

FIG. 4 is a plan view which illustrated the ejector in a deployed position and the deflectors in a partially deployed position;

Throughout the drawings and the following specification the same numbers designate the same parts.

DETAILED DESCRIPTION

Figure 1:
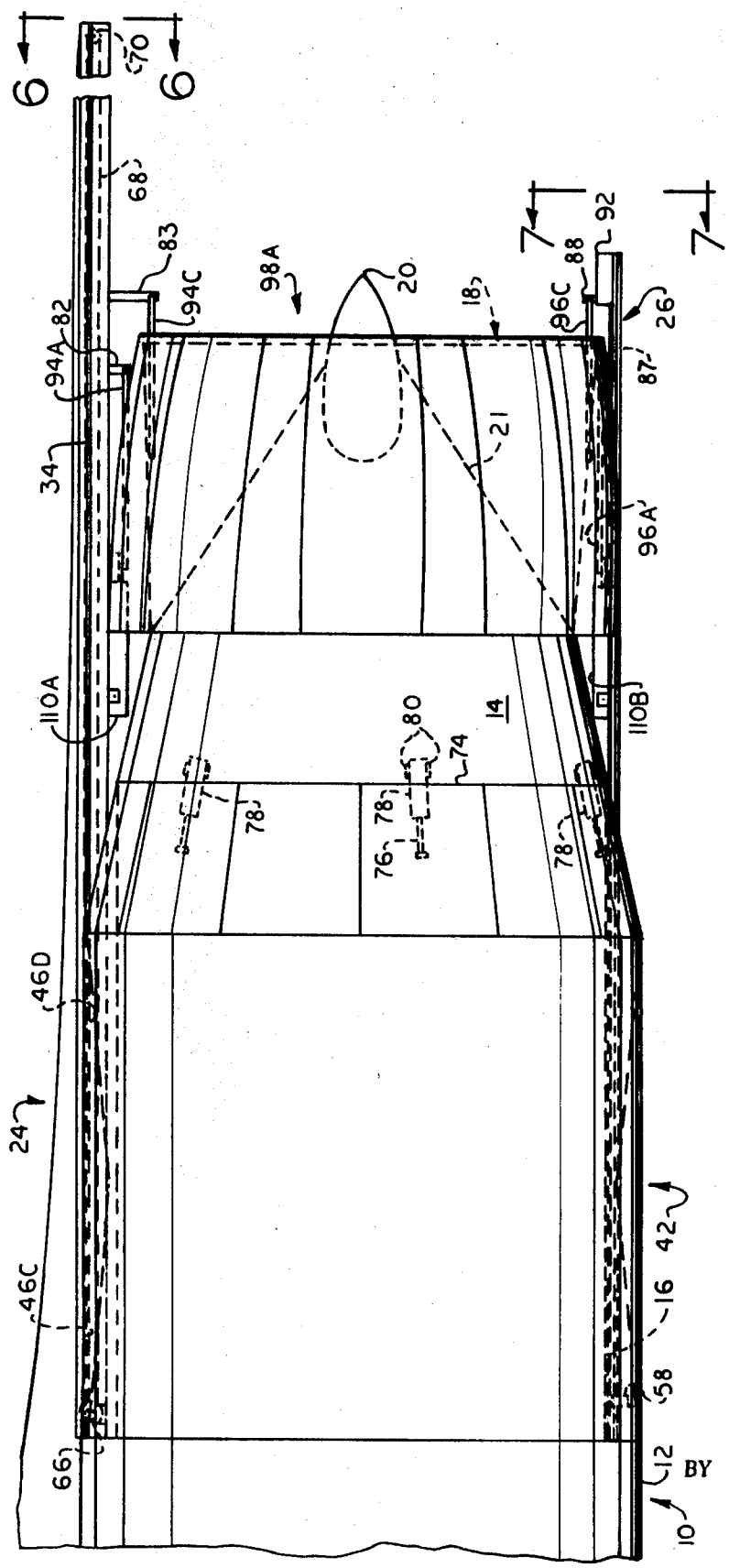
FIG. 1 is a side elevation of the aft end of an aircraft jet engine housing provided with an ejector and deflectors in accordance with one embodiment of the present invention, said ejector and deflectors being illustrated in retracted positions thereof.
Figure 2:
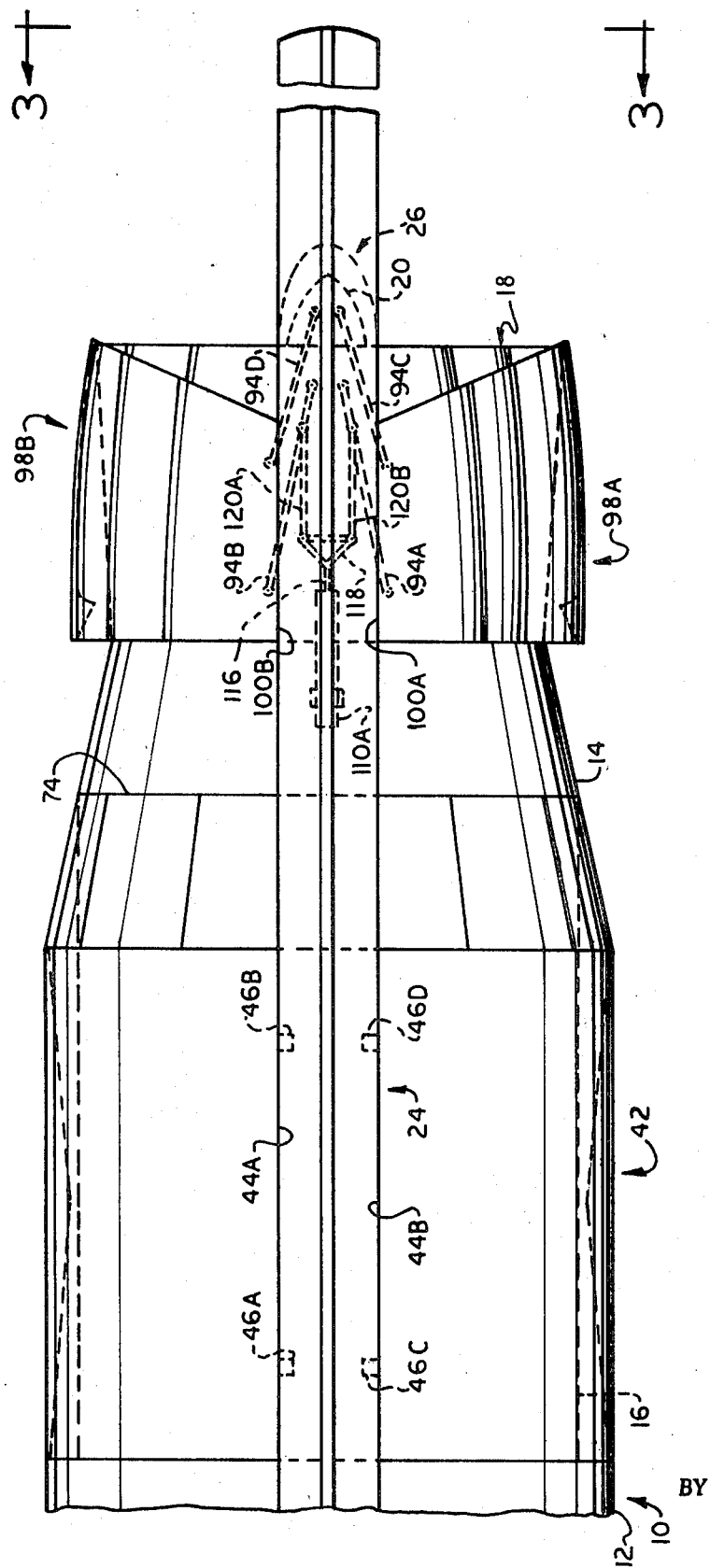
FIG. 2 is a plan view of the same apparatus, also illustrating the ejector and deflectors in the retracted positions thereof.
Figure 3:
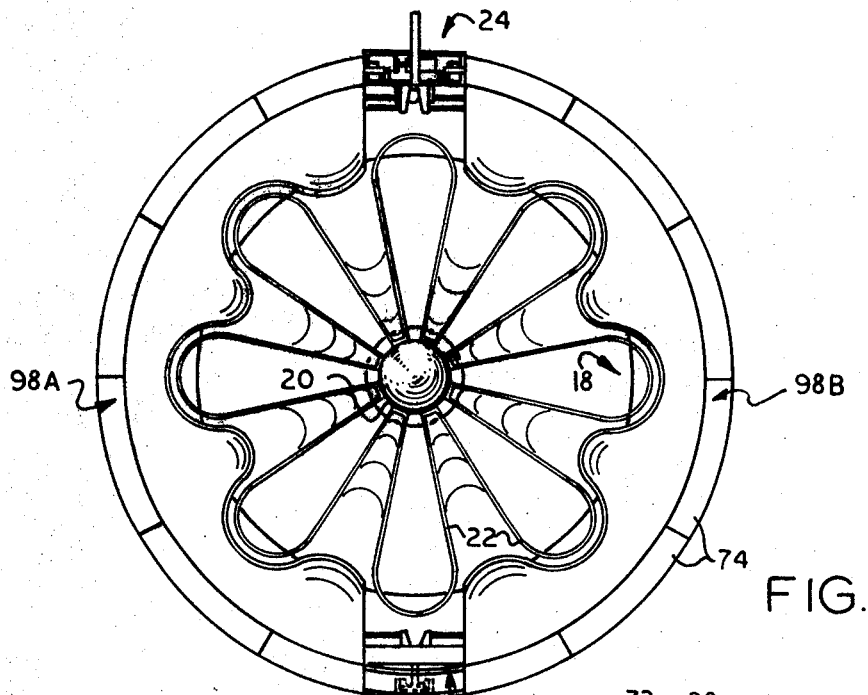
FIG. 3 is an end view of the same embodiment of the invention, taken along the plane represented by line 3—3 in FIG. 2 and in the direction indicated therein.
Figure 6:
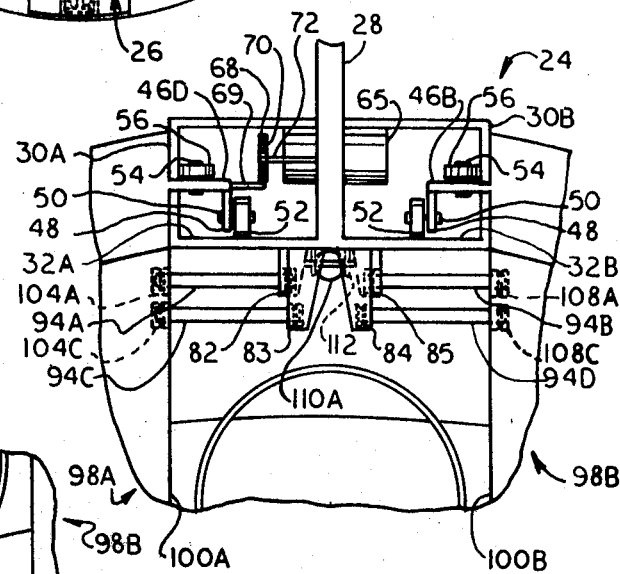
FIGS. 6 and 7 are enlarged, fragmentary end views of components of the apparatus, respectively taken along the planes represented by lines 6—6 and 7—7 in FIG. 1 and in the direction indicated therein, the wall of the ejector being broken away in the drawing so that a bracket attached to the inner surface thereof can be seen.
Figure 7:
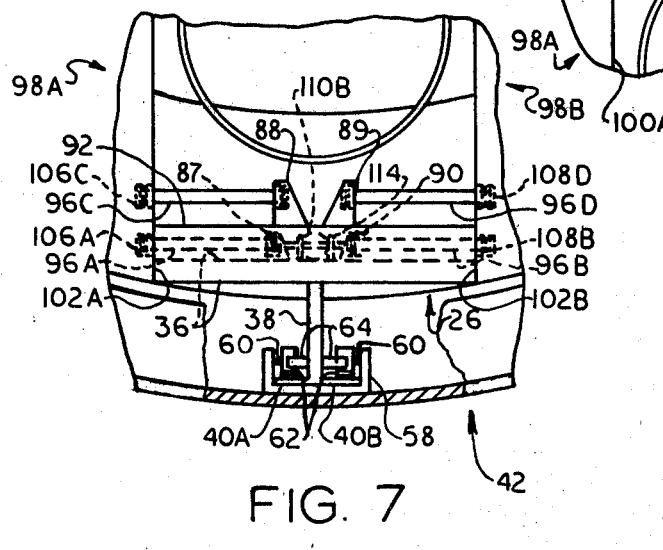

In the drawings the number 10 generally designates a housing which encloses an engine of a jet-propelled aircraft and which comprises a cylindrical forward portion 12, a frustoconical aft end portion 14, and a cylindrical portion 16 extending between said forward and aft end portions. The diameter of the intermediate portion 16 is less than that of the forward portion of the housing (see FIGS. 1–3, wherein the wall of said portion 16 is represented by broken lines, and FIG. 4). A longitudinally corrugated thrust nozzle, generally designated by the number 18, is coaxially mounted on the aft end of housing 10 and comprises an inner member 20 which is attached at the aft end of the nozzle to the innermost edges 21 of the lobes 22 (see FIGS. 1 and 3) formed on the nozzle by the indentations in the wall thereof. As illustrated in FIGS. 1 and 3, a pair of elongate supports, generally designated by the numbers 24 and 26, are integrally joined at one end thereof to the forward portion 12 of housing 10 and extend rearwardly therefrom in spaced relation with the peripheries of nozzle 18 and portions 14 and 16 of said housing, the longitudinal axes of the supports being spaced apart 180° on the housing and parallel with the longitudinal axis of housing 10. More particularly, as illustrated in FIG. 6 support 24 includes a vertically disposed central member 28, two upper wall sections 30A, 30B which respectively extend laterally from opposite sides of said central member and then curve downwardly so that the unattached longitudinal edges thereof lie in a horizontal plane, and two lower wall sections 32A, 32B which respectively extend laterally from opposite sides of the lowermost portion of said central member and then upwardly so that the unattached longitudinal edges thereof also lie in a horizontal plane, the aforesaid unattached edges of said upper and lower sections which are situated on the same side of said central member being vertically aligned. Thus there is a longitudinally extending slot 34 (see FIG. 1) in each side of support 24. As illustrated in FIG. 7, support 26 is formed with a flat, horizontally disposed upper plate 36, a vertically disposed member 38 which depends from the middle of said upper plate, and two flanges 40A, 40B which respectively extend laterally from opposite sides of the lowermost portion of said member 38.

A tubular ejector, generally designated by the number 42, is supported on supports 24 and 26 for movement axially thereof while being maintained in coaxial relation with housing 10 and nozzle 18. More specifically, a slot extends between the ends of the ejector at its upper portion, and the edges 44A, 44B (see FIG. 2) of this slot respectively slidably abut the outer surfaces of the vertically extending portions of upper and lower wall sections 30A, 30B, 32A, 32B which are on the same side of support 24. Fixedly mounted on each edge 44A, 44B and respectively located adjacent the forward and aft ends of the ejector are two support lugs 46A–46D the upper and lower surfaces of which respectively slidably abut the unattached longitudinal edges of said upper and lower sections of support 24. A shoulder 48 (illustrated in FIG. 6 only) depends from the free end of each lug 46 and has one end of a support pin 50 mounted in an aperture therein, the longitudinal axis of said aperture being perpendicular to the sides of the central member 28 of support 24 and the projecting end of said pin carrying a roller 52 which engages the inner surface of the laterally extending portion of a respective one of the lower wall sections 32A, 32B of said support. Each lug is also provided with a vertically disposed pin 54 on which a second roller 56 is mounted, the latter contacting the inner surface of the vertically disposed portion of a respective one of the upper wall sections 30A, 30B of support 24.

As illustrated in FIGS. 1 and 7, a bracket 58 having a U-shaped cross section is attached to the inner surface of ejector 42 adjacent the forward edge of said ejector and is centered on the vertical centerline thereof. Each arm of this bracket contains an aperture in which one end of a support pin 60 is fixedly secured, the longitudinal axis of said aperture being perpendicular to the sides of member 38 of support 26 and the projecting end of said pin carrying a roller 62 which is supported upon a respective one of the flanges 40A, 40B of said support. A stop pin 64 is positioned in an aperture in the aft end of member 38 and extends laterally from opposite sides of said member so as to limit the movement of rollers 62 (and thus the movement of ejector 42) in the rearward direction.

The ejector is moved axially on supports 24 and 26 by means of a suitable motor 65 (see FIG. 6) having a sprocket 66 (see FIG. 1) mounted on the drive shaft thereof, said motor being fixed in position at the forward end of the interior of support 24. A link chain 68 is engaged with sprocket 66 and with a sprocket 70 mounted on a support pin 72 that projects from member 28 of said support 24 adjacent the aft end thereof. Each lug 46C and 46D is formed with a small projection 69 that engages chain 68, and hence the ejector can be moved between a retracted position wherein it is disposed around portion 16 of housing 10, as illustrated in FIGS. 1 and 2, and a deployed position wherein the forward end of said ejector is even with the aft end of nozzle 18, as illustrated in FIG. 4. In connection with such movement of the ejector, notice should now be taken of a plurality of vanes 74 which are hinged at their aft edges to housing 10 at the junction of portions 14 and 16 thereof and which are disposed in side-by-side relation around the periphery of said housing. The forward edges of the vanes are interconnected by suitable means and the drive shafts 76 of actuators 78 are respectively connected to the inner surfaces of alternate vanes, said actuators being in turn connected to arms 80 that project from the inner surface of portion 14 of housing 10. Actuators 78 may be of any suitable type and are adapted to simultaneously rotate vanes 74 between a first position wherein the forward edges thereof are flush with the aft edge of ejector 42 when the latter is in its retracted position to thereby form a smooth continuation of the wall of housing 10, and a second position wherein said forward edges are disposed inwardly from aft edge of said ejector to thereby permit said ejector to move to its deployed position. As illustrated by broken lines in FIG. 4, the side edges of the vanes are overlapped when said vanes are rotated inwardly.

Four supports 82–85 are fixedly mounted on the lower side of support 24 and depend therefrom adjacent the aft end of nozzle 18. Four supports 87–90 are also fixedly mounted on the upper side of support 26 and project upwardly therefrom, two of the latter supports being located on an enlarged section 92 (see FIG. 1) of said support 26 at the aft end thereof. Four arms 94A–94D are respectively pivoted at one end thereof to supports 82–85 (see FIGS. 1 and 6), and four arms 96A–96D are likewise respectively pivoted to supports 87–90 (see FIG. 7). Pairs of the aforesaid arms are respectively pivoted to the inner surfaces of two hemicylindrical deflectors (generally designated by the numbers 98A, 98B) adjacent the upper and lower longitudinal edges 100A, 100B, 102A, 102B, thereof (see FIGS. 2, 6 and 7). More explicitly, arms 94A and 94C are respectively pivoted to bosses 104A, 104C formed on the inner surface of deflector 98A adjacent the upper longitudinal edge 100A thereof, and arms 96A, 96C are respectively pivoted to bosses 106A, 106C formed on the inner surface of the same deflector adjacent the lower longitudinal edge 102A thereof. The pairs of arms 94B, 94D and 96B, 96D are likewise pivoted to pairs of bosses 108A, 108C and 108B, 108D respectively formed on the inner surface of deflector 98B adjacent the upper and lower longitudinal edges 100B, 102B thereof. Both deflectors have a plurality of longitudinally extending corrugations formed in the walls thereof, which corrugations increase in depth in the rearward direction and are arranged so that the walls of the deflectors extend into the corrugations of nozzle 18 when said deflectors are in the retracted position thereof which is illustrated in FIGS. 1–3. It will be noted in last-mentioned drawings that the forward portions of the longitudinal edges 100A, 100B, 102A, 102B of the deflectors respectively abut the sides of supports 24 and 26 when said deflectors are retracted.

Deflectors 98A and 98B are respectively movable between retracted, partially deployed, and fully deployed positions (which latter positions will be further considered hereinafter) by means of two synchronously operated actuators 110A, 110B one of which is mounted between lugs 112 on the lower side of support 24 and the other of which is mounted between lugs 114 on the upper side of support 26. The drive shaft 116 of actuator 110A is coupled to a triangular frame 118, and a pair of links 120A, 120B are pivotally connected to this frame and to arms 94A, 94B, respectively. The drive shaft of actuator 110B is connected in the same way to arms 94C, 94D, and thus it is considered unnecessary to illustrate the corresponding frame and links associated with this actuator. Actuators 110A, 110B may be powered by any suitable means, such as a hydraulic system. Selection of the position of the deflectors and ejector 42 is afforded by conventional control systems operatively connected to said actuators 110A, 110B and to motor 64, respectively, the actuators 78 which rotate vanes 74 being interconnected with the drive system for the ejector so that said vanes are automatically moved inwardly to permit deployment of the ejector and also automatically returned to the position illustrated in FIGS. 1-3 when said ejector is thereafter retracted.

OPERATION

During cruise flight of an aircraft provided with the above-described apparatus, the components of the latter are positioned as illustrated in FIGS. 1-3, namely, ejector 42 is disposed around portion 16 of housing 10 and abuts the rear edge of the forward portion of said housing, the forward edges of vanes 74 are even with the aft edge of said ejector, and deflectors 98A, 98B respectively abut the sides of supports 24 and 26. When the components are in this configuration, air flows along the aft end portion 14 of the housing and into the space between each deflector and nozzle 18. This airflow not only eliminates aerodynamic drag at the base of the nozzle but also augments the thrust of the gas discharged from the latter. Since the jetstreams issuing from the lobes 22 of the nozzle are surrounded by streams of air issuing from the passage between the deflectors and nozzle, the noise of said jetstreams is also suppressed.

At the time of takeoff of the aircraft, or at any other time when thrust augmentation is desired, actuators 78 are simultaneously operated to rotate the forward ends of vanes 74 toward the periphery of portion 16 of housing 10 and motor 64 is then operated to move ejector 42 to the position thereof which is illustrated in FIG. 4, said motor being stopped automatically when rollers 62 contact pin 64. Actuators 110A, 110B are next simultaneously operated to rotate deflectors 98A, 98B from their retracted position to the partially deployed position which is also illustrated in FIG. 4, suitable limit switches (not shown) stopping the extension of the drive shafts of said actuators at the proper position of the deflectors. It will be noted that when the deflectors are in the partially deployed position the middle portions of their forward edges are spaced farther from the longitudinal axis of housing 10 and nozzle 18 than the wall of ejector 42. Hence air which would not be intercepted by the ejector impinges upon the deflectors and is directed thereby into the throat of the ejector. More explicitly, this air is directed toward the longitudinal axis of said ejector and mixed with the jetstreams discharged from the nozzle, which mixing reduces the noise energy associated with the same. Obviously the mass flow of air through the ejector is also increased by the action of the deflectors, so that thrust of the jetstreams is greater than that provided by the use of the ejector alone.

Figure 5:
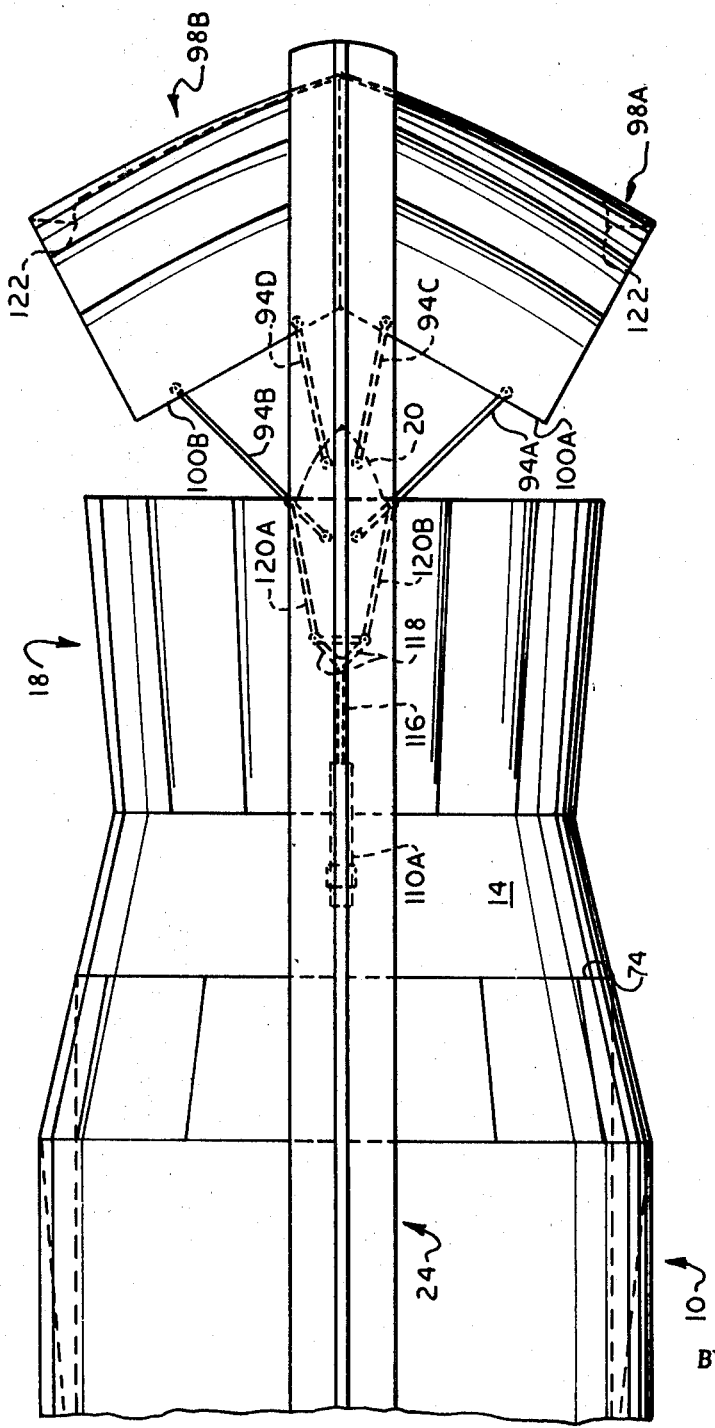
FIG. 5 is a plan view which illustrates the ejector in a retracted position and the deflectors in a fully deployed position.

Deflectors 98A, 98B and ejector 42 can of course be readily returned to their retracted, cruise flight position by operating the drive systems respectively associated with actuators 110A, 110B and motor 64 in the reverse direction. As noted hereinbefore, vanes 74 automatically return to the position illustrated in FIG. 1 after the ejector is moved to its retracted position. When the aircraft is making a landing approach, actuators 110A, 110B are operated to swing the deflectors to the downstream position illustrated in FIG. 5, wherein the rear edges of said deflectors abut each other and the thrust gas discharged from nozzle 18 impinges upon the inner surfaces of said deflectors and travels outwardly to ridges 122 formed on said surfaces and thence in the forward direction. Thus thrust reversal and deceleration of the aircraft are achieved by the same deflectors which augment thrust during other periods of flight.

Although this invention has been described with reference to a particular embodiment of the same, it should not be considered to be limited thereto for various modifications could be made therein by one having ordinary skill in the art without departing from the spirit and scope of the invention as defined in the following claims. For example, in some embodiments of the invention thrust nozzle 18 may be enclosed within the aft portion of housing 10, in which case deflectors 98A, 98B still intercept air flowing past said housing and direct the same around the jet stream or streams discharged from said nozzle.

It will also be obvious that the number of deflectors employed in different embodiments of the invention may vary.

What is claimed as new and useful and desired to be secured by U.S. Letters Patent is:

1. In an aircraft, the combination comprising:
   a housing enclosing a jet engine having a thrust nozzle;
   a tubular ejector mounted on said aircraft for movement between a retracted position wherein it is disposed around said housing and a deployed position wherein it is downstream from said housing and thrust gas of said engine flows therethrough;
   a plurality of deflectors mounted on said aircraft for movement independent of said tubular ejector between (a) a retracted position wherein the forward ends thereof are spaced a first distance outward from the aft end of said housing so as to intercept a predetermined volume of air flowing past the latter and direct the same toward and around at least the greater portion of the expansion boundary of said thrust gas, a partially deployed position wherein the forward ends thereof are spaced a second distance outward from the aft end of said housing and stopped and fixed in such position, said second distance being greater than said first distance, and wherein said deflectors intercept a volume of said air larger than said predetermined volume and direct the same into the forward end of said ejector when the latter is in said deployed position thereof, said air also being directed toward the longitudinal axis of said ejector, and a fully deployed position wherein said deflectors intercept said thrust gas and change the flow direction thereof; and
   means operatively associated with said ejector for moving it, independently of said deflectors, between said retracted and deployed positions thereof;
   means operatively associated with said deflectors for moving the same between said retracted, partially deployed, and fully deployed positions thereof.

2. The combination defined in claim 1 wherein the thrust nozzle of said engine projects from the aft end of said housing and said deflectors, when retracted, direct said air along the periphery of said nozzle before it flows around the expansion boundary of said thrust gas.

3. In an aircraft, the combination comprising:
   a housing enclosing a jet engine;
   a tubular ejector mounted on said aircraft for movement between a retracted position wherein it is disposed around said housing and a deployed position wherein it is downstream from said housing and thrust gas of said engine flows therethrough;
   means operatively associated with said ejector for moving it between said retracted and deployed positions thereof;
   a plurality of deflectors mounted on said aircraft for movement between (a) a retracted position wherein the forward ends thereof are spaced a first distance outward from the aft end of said housing so as to intercept a predetermined volume of air flowing past the latter and direct the same toward and around at least the greater portion of the expansion boundary of said thrust gas, (b) a partially deployed position wherein the forward ends thereof are spaced a second distance distance outward from the aft end of said housing, said second distance being greater than said first distance, and wherein said deflectors intercept a volume of said air larger than said predetermined volume and direct the same into the forward end of said ejector when the latter is in said deployed position thereof, said air also being directed toward the longitudinal axis of said ejector, and (c) a fully deployed position wherein said deflectors intercept said thrust gas and change the flow direction thereof;
   means operatively associated with said deflectors for moving the same between said retracted, partially deployed, and fully deployed positions thereof;
   said thrust nozzle of said engine projects from the aft of said housing and said deflectors, when retracted, direct said air along the periphery of said nozzle before it flows around the expansion boundary of said thrust gas; and said nozzle and deflectors are corrugated longitudinally and the walls of said deflectors extend into the corrugations of said nozzle when said deflectors are retracted so that said air is directed between the lobes of said nozzle.

4. In an aircraft, the combination comprising:

a housing enclosing a jet engine and having a reduced diameter at its aft portion, the thrust nozzle of said engine being corrugated longitudinally and projecting from the aft end of said housing;

an elongate support fixedly connected to said housing and projecting from the aft end thereof, the longitudinal axis of said housing and support being parallel;

a tubular ejector mounted on said support for movement longitudinally thereof while being maintained in coaxial relation therewith, said ejector being disposed around the reduced diameter portion of said housing when in a retracted position so as to form a smooth continuation of the housing all forward thereof and being disposed aft of said nozzle when in a deployed position so that thrust gas discharged from the latter flows therethrough;

means operatively associated with said ejector for moving it between said retracted and deployed positions thereof;

a plurality of vanes hinged in side-by-side relation around said housing adjacent the aft end thereof and rotatable between a first position wherein the forward edges thereof are flush with the aft edge of said ejector when the latter is in its retracted position to thereby form a smooth continuation of the wall of said housing and a second position wherein said forward edges are disposed inwardly from the aft edge of said ejector to thereby permit said ejector to move to its deployed position; and a plurality of deflectors mounted on said aircraft for movement between (a) a retracted position wherein the forward ends thereof are spaced a first distance outward from the aft end of said housing so as to intercept a predetermined volume of air flowing past the latter and direct the same toward and around at least the greater portion of the expansion boundary of said thrust gas, said deflectors being formed with longitudinally extending corrugations and the walls thereof extending into the corrugations of said nozzle when said deflectors are retracted so that said air is directed between the lobes of said nozzle; (b) a partially deployed position wherein the forward ends thereof are spaced a second distance outward from the aft end of said housing, said second distance being greater than said first distance, and wherein said deflectors intercept a volume of said air larger than said predetermined volume and direct the same into the forward end of said ejector when the latter is in said deployed position thereof, said air also being directed toward the longitudinal axis of said ejector, and (c) a fully deployed position wherein said deflectors intercept said thrust gas and change the flow direction thereof; and means operatively associated with said deflectors for moving the same between said retracted, partially deployed, and fully deployed positions thereof.

5. The combination defined in claim 4 including:

a second elongate support fixedly connected to said housing and projecting from the aft end thereof, the longitudinal axes of said housing and second support being parallel and said supports being diametrically opposed on said housing; and a plurality of arms respectively pivotally connected at one end thereof to said deflectors and at the other end thereof to said supports, thereby permitting movement of said deflectors between said retracted partially deployed, and fully deployed positions thereof, the side edges of said deflectors abutting the longitudinal edges of said supports when said deflectors are in their retracted position.

6. A method of operating a jet-propelled aircraft, which comprises:

during cruise flight of said aircraft, positioning a tubular ejector in a retracted position wherein it is disposed around an engine housing of said aircraft and positioning a plurality of deflectors in a retracted position wherein the forward ends thereof are spaced a first distance outward from the aft end of said housing and intercept a predetermined volume of air flowing past the latter and direct the same toward and around at least the greater portion of the expansion boundary of thrust gas of the engine within said housing:

during the period of operation of said aircraft when maximum thrust augmentation is required, positioning and stopping said ejector in a deployed position wherein it is downstream from said housing and said thrust gas flows therethrough and positioning said deflectors in a partially deployed position wherein the forward ends thereof are spaced a second distance outward from the aft end of said housing, said second distance being greater than said first distance, and wherein said deflectors intercept a volume of said air larger than said predetermined volume and direct the same into the forward end of said ejector and toward the longitudinal axis of said ejector; and during landing of said aircraft, positioning said ejector in said retracted position thereof and positioning said deflectors in a fully deployed position wherein they intercept said thrust gas and change the flow direction thereof.